Patented Feb. 26, 1935

1,992,240

UNITED STATES PATENT OFFICE 1,992,240

METHOD OF MAKING BITUMINOUS COMPOSITIONS

Samuel S. Sadtler, Springfield Township, Montgomery County, Pa., assignor, by mesne assignments, to Hepburnite Corporation, a corporation of Maryland No Drawing. Application January 3, 1931, Serial No. 506,503

9 Claims. (Cl. 106—31)

My invention relates to those bituminous compositions which are used to coat or cover objects of various kinds and which are required to withstand climatic conditions and more particularly to the securing of a more perfect contact between the bituminous material and the object to which it is applied, thereby increasing the bond therebetween and securing a firmer and more permanent adhesion of the composition to the object.

One of the common uses of bituminous compositions is in road and pavement making, wherein a bituminous composition comprising an asphaltic cement is used as a binder for various kinds of mineral aggregate, generally stone, of varied sizes down to sand sizes. Pavements of this kind are subjected to all sorts of weather and unless there is a firm bond between the coating and the pieces of aggregate water is liable to cause the asphaltic coating to strip and loosen from the mineral aggregate, to the great detriment of the road.

Another common use of bituminous compositions is in making paints and coating materials, particularly those used for outside work, to protect walls, metal, roofing, wood and the like and my invention is applicable to the making of those compositions.

It is the object of the present invention to produce a better, stronger and more permanent bond between a bituminous cement and the object to which it is applied and to so treat the bituminous material, or the object to which it is applied, in such a way that the bituminous material will firmly adhere to materials and substances with which they do not normally form so strong a bond.

It is a well recognized fact that a given bituminous substance, such as asphaltic cement, will readily adhere to some objects and will form a firm bond therewith, while the same cement will not unite firmly to another or different material or substance and that another asphaltic cement may not adhere firmly to the first object or material above referred to, but may form a firm bond with the second.

A further object of this invention is to enable one to select an asphaltic cement best adapted for use with which to coat a given object or material and, conversely, to be able to select, when possible, a material to be coated to which a given cement will firmly adhere.

A further object of this invention is to so treat fluid or semi-fluid bituminous substances as to reduce the surface tension thereof without otherwise substantially affecting those properties which render the bituminous material suitable for road building operations, painting operations and the making of plastic compositions, and to increase or strengthen the bond between the bituminous coating material and the surface to which it is applied by reason of the better contact of the bituminous material with the object.

A further object of this invention, as particularly applied to road making, is to enable one to select for the coating and for material to which it is to be applied, those known to carry opposite charges of electricity, and to enable one to increase the intensity of the polarity or of the charge of electricity carried by one of the two when its charge is weak, and to change its polarity when it is opposite to that of the other.

In the making of any mixture of a bituminous cement with mineral aggregates or fillers, wherever a permanent water-resisting bond is required between the cement and the individual pieces of aggregate or filler, uncertainty as to the permanence of the bond always arises whenever it becomes necessary or advisable to vary or change one of the ingredients for another of the same kind.

Thus if during a paving operation it becomes necessary to obtain the cement from another source without changing the aggregate, the question of whether the new cement will satisfactorily bind the aggregate together permanently, could not be heretofore satisfactorily answered without experimentation or actual trial or by the mixing of a test batch, unless the substitution was known to have been made before and had been found to be satisfactory.

Similarly, unless the mixture has been successfully made before and thus empirically determined, it has heretofore been impossible to know in advance whether a mineral aggregate easily obtainable or accessible for use in a definite territory will satisfactorily firmly unite with the cement which it is proposed to use therewith, or to know in advance what cement will make a strong bond with the particular mineral aggregate and not be likely to strip therefrom, especially when wetted.

The same considerations arise in connection with the making of such compositions as are used for painting outside work. A paint may adhere well to one object or given material, e. g., to a wooden roofing, but it may not adhere strongly to another material, e. g., a cement wall or a metal roof.

In view of this I have made an extensive study, and have made laboratory tests and actual tests, with many bituminous materials, and with many materials and ingredients which might be used in making paving mixtures, paints and the like, in an effort to determine what chemical or physical characteristics or properties of these different substances are responsible for the firm adherence or the lack of firm adherence of a given bituminous substance to an object to which it is applied and how such characteristics or properties can be modified or changed to produce the best, strongest, and most permanent bond therebetween.

In the course of my research, I discovered that one of the factors which makes it difficult to form a strong, permanent adhesion between a bituminous cement on the one hand and stone, wood or other material on the other hand, is the relatively high surface tension of bituminous compositions and particularly fluid or semi-fluid bituminous cements and that the affinity or attraction between a fluid or a semi-fluid bituminous cement and the object to be coated therewith is not always sufficient to overcome the surface tension of the water, or attraction of water to these objects, if the aggregate is wet.

I have further disovered that the addition to a mixture of asphalt and aggregate and preferably to the asphalt, of a very small proportion of certain ingredients, greatly varies the surface tension of liquid asphalts and that whenever the surface tension is reduced a better stronger bond between the cement and the aggregate is more readily attained when water is present as is frequently the case with roads and pavements, and objects exposed to the weather.

Having found that the surface tension of asphalts can be substantially varied by the addition thereto of small quantities of various ingredients and having found that some materials substantially increase the surface tension and that others substantially decrease it, I tested various kinds of asphalts and observed and noted the extent to which different materials in different proportions changed the surface tension thereof.
Some of the materials which reduce the surface tension very markedly are too expensive to be used commercially in the making of such compositions as those employed for paving roads or for painting various objects out of doors where they are subject to climatic changes and conditions.

The materials which I find to be best suited to the purpose of reducing the surface tension of native and pyrogenous bituminous substances in a fluid or semi-fluid state are gum rosin and paraffine.

The addition to melted bituminous cement, e. g., asphalt having a normal penetration of 92 and heated to 250° F., of one-half of one per cent by weight of natural gum rosin, I found to reduce the surface tension 29% below what it was before the rosin was added; that when one-half of one per cent by weight was added (making a total addition of 1%) the surface tension increased slightly but was nevertheless 26% below what it originally was; and that when 1% more of gum rosin was added (making a total of 2%), the surface tension substantially increased and was only 15% below that of the original asphalt.
I also found that the addition to the melted bituminous cement under the same conditions of 1% of paraffine reduced the surface tension of the mixture by 26%; that the addition of 2% of paraffine to the cement slightly increased the surface tension to 23% below that of the original;

and that 3% of paraffine increased the surface tension until it was only about 10% below that of the original asphalt. Since both of these materials, gum rosin and paraffine, are easily procured, are relatively inexpensive, and since a small quantity of either reduces the surface tension nearly as much as some of the more expensive and less easily procurable ingredients, such as aluminum oleate and diphenyl, the former are more desirable for use in the making of bituminous pavements, paints and the like. Of these two materials, (gum rosin and paraffine) gum rosin appears to be somewhat preferable, because only one-half of one per cent by weight is needed to produce its maximum effect of reducing the surface tension of the cement, and because one per cent of it results in the reduction of the surface tension to the same point that 2% of paraffine reduces it.

I am aware that both rosin and paraffine have long been known to be readily soluble in bituminous substances when the temperature is sufficiently high to render both of them fluid, but it has also been well known that the presence of these ingredients in an asphaltic cement or paint or varnish reduces the resistance of such bituminous substances to water, and heretofore the use of rosin and paraffine in a bituminous cement or bituminous paint for out-of-door work has been carefully avoided because they weaken the resistance of the bituminous material to water.

I have discovered, however, that the small amount of rosin or paraffine which I use,—and it is all that is required to greatly reduce the surface tension of the bituminous cement or paint,—
is so small that its effect on the water resistance of the cement or pain is practically nothing. I do not use these ingredients in quantities sufficient to destroy the water resistance of the paint or cement. They do, however, so substantially weaken the surface tension of the bituminous material that the contact of the bituminous material with the object to be coated therewith is closer, more intimate and stronger than it is when one of those ingredients is not mixed therewith. A closer contact of the bituminous material with the object is effected without substantially reducing the weather resistance of the cement or other bituminous material employed.
I also tested by electrophoresis, various kinds of bituminous materials and I have found that while they are nearly neutral electrically they all carry small charges of electricity, and that some cements carry a positive charge and that others carry a negative charge. Among the bituminous materials that I have found to carry a positive charge are Trinidad liquid asphalt, blown cement, Cuba asphalt, Gulf Coast asphalt, Mexico asphalt and gilsonite, all of which are attracted to the negative pole of an electrophoretic cell and are, therefore, positive. I have discovered, however, that some samples of California asphalt and of Natural Trinidad Lake asphalt and powdered coal, both anthracite and bituminous, are attracted to the positive pole and therefore carry negative charges.

I also tested various materials which may be used as aggregates in bituminous paving mixtures and as fillers in paints and plastic compositions, and I found some to be attracted to the positive pole and some to the negative pole when pulverized and suspended in a suitable liquid vehicle or electrolyte and subjected to a current of direct electricity in an electrophoretic cell. The materials which may be used as aggregates and which are attracted to the positive pole and are therefore considered negative, are feldspar, lava, flint, trap rock, sand, metallurgical slag and generally those minerals high in silica, while those attracted to the negative pole and are therefore positive, were limestone and generally those minerals which are rich in the metals.

I also found that when the polarities of the cement and of the aggregate are opposite, a firmer bond between the cement and the aggregate is always produced than where the cement and the aggregate are of the same polarity or carry relatively like charges.

I also tested, in the same manner, by electrophoresis, a large list of ingredients, some of which have, and some of which have not been, to my knowledge, used as fillers in the making of a bituminous coating and paving materials and I found that substantially all of them carry either positive or negative charges.

Calcium hydroxid, calcium oxid, Portland cement, carbonate of lime and powdered limestone are attracted to the negative pole and, therefore, carry a positive charge of electricity, while pulverized coal (anthracite and bituminous), carbon black, silex, sodium silicate, diatomaceous earth, and Tripoli, powdered silica, silicate of soda, were found negative, being attracted to the positive pole.

I also found that very small quantities of the finely divided filler materials last above listed, which are insoluble in said bituminous cement or coating material, but are readily miscible therewith, impart to the asphalt their electrical characteristics. If, for instance, the asphalt be normally slightly positive, the addition thereto of lime or calcium hydroxid makes the cement or coating, or mass much more strongly positive and make it adhere more strongly to negative aggregates such as trap rock. If such bituminous material is slightly negative, the addition of small quantities of the said ingredients changes the polarity of the bituminous substance from negative to positive and makes it more readily and more firmly unite to the negative aggregates and form a firm bond therewith.

If the bituminous cement be normally slightly negative, it forms a much better bond with the aggregates carrying a positive charge of electricity such as limestone, and minerals rich in metal, but if such modifiers or fillers as are above indicated to be negative be added to the cement, the bond of such negative cement with such positive aggregates is much firmer and much more readily formed. If, however, slightly positive bituminous cement be admixed with a small quantity of the negative modifiers or fillers, the cement becomes practically negative and it forms a strong bond with the positive aggregates above listed.

From the above it will be plain that, other things being equal, one negative aggregate can be substituted for another negative aggregate and a firm strong bond between a positive cement and the aggregate will ensue without necessitating any change in the cement and conversely, cements of like polarity may be substituted one for the other, without requiring any substantial change in an aggregate of opposite polarity or the filler used therewith and that the choice of and addition to the cement of a positive or a negative modifier will adapt the cement for its firm union with a negative or positive aggregate respectively.

The present invention is based upon these discoveries and principles. By reducing the surface tension of the asphalt or other fluid bituminous material, the surface tension of the said material with respect to the stone may be made less than that of water with respect to the stone, and by a proper selection of an aggregate and of an asphaltic cement or other bituminous material to unite therewith of different polarities electrically or by changing the polarity of such material to the opposite of that which the aggregate or other surface carries, or the reverse, the bond between the bituminous material and the material to be coated therewith may be readily substantially increased sufficiently to give better commercial results than where heretofore possible.

The quantities of gum rosin or paraffine sufficient to substantially reduce the surface tension of fluid asphalt is very small. There is no particular advantage in using more than one-half of one per cent of gum rosin or more than one per cent of paraffine for a greater quantity does not reduce the surface tension as much as the smaller quantity. As above pointed out, the greater quantity tends to defeat the object.

I have also found, however, that when hydrated lime is added to the mixture, the quantity of rosin should be about one per cent of the weight of the cement for the rosin appears to combine with the calcium forming calcium resinate. This is quite desirable for in many cases, the calcium component or ion will help electrically, and the resin component will reduce the surface tension, thus producing the double result by the mere addition of the small percentage of rosin to a mix requiring lime or wherein lime is present. When no hydrated lime, or its equivalent is to be added to the mixtures one-half of 1% of rosin reduces the surface tension of the asphalt more than 1% of rosin does.

The quantities of modifying material added to the mixture and preferably to the cement during the mixing operation, may be merely for the purpose of charging or intensifying the polarity of the cement or it may constitute or form a part of the filler which is usually added thereto in the ordinary practice of making bituminous bound paving material, when that filler is of the correct polarity for use with the cement employed. In this simple way one may readily secure a stronger and better bond between a bituminous coating and the object to which it is applied by reducing the surface tension of the coating and by the selection of cements and objects having different polarities or bearing opposite electrical charges respectively by adding one or more modifying ingredients operative to reduce said tension and to reverse or augment the normal polarity of one of the said two main ingredients, the bituminous compound and the object.

In applying my invention, the charge of electricity which the aggregate to be used in the paving operation normally, if not known, must be determined by electrophoresis. Let it be assumed that a particular limestone, or mineral rich in metal which is to be used is found to normally carry a positive charge of electricity; then a cement carrying a negative charge of electricity, such as California asphalt or natural Trinidad asphalt is best adapted for use therewith and the attraction between the two may be increased by the addition thereto of a negative modifier, such as carbon black, powdered coal and powdered silica. If such a negative cement is not available in the particular locality where the pavement is to be made, a cement which is weakly positive may be used by adding to such positive cement a little more of a negative modifier than would be necessary with a negative cement and thoroughly distributing it throughout the cement to impart to the cement its properties.

In the practice of this process of making a bituminous paving material for placement on the roadway, with metallurgical slag, which is negative as the aggregate, the first steps are to grade and dry and then to apply to the aggregate a suitable liquefier or solvent of bitumen, such as kerosene or a mixture of kerosene and naphtha in quantity only sufficient to be absorbed by the surfaces of the aggregate. In using this slag from 2 to 2½ gallons of liquefier or solvent to the ton of finished mixture will generally be sufficient. Then an asphalt which carries a positive charge of electricity, e. g. Mexican asphalt of from 85 to 100 penetration and in a melted condition, may be added to the aggregate in a mixing machine, the amount of cement being from 100 to 120 pounds to the ton of mixture and the mixture is vigorously agitated. While the agitation is being continued there is added to the mixture a small quantity of gum rosin. There should also be added to the mixture a finely powdered modifier carrying an electric charge opposite to that of the slag, that is to say, carrying a positive charge, exemplified in hydrated lime or powdered carbonate of lime. Because lime is preferably used in this mixture, the quantity of rosin should be about 1% of the weight of the asphalt as described above. This fine material is thoroughly distributed throughout the asphalt by agitation imparting to the asphalt an electrically positive characteristic and thereby increasing the affinity between the cement and the aggregate. The addition of this small quantity of gum rosin reduces the surface tension of the cement nearly 30% and with the increased affinity between the cement and the stone, the surface tension of the cement is apparently as low as or lower than water at the same temperature and the cement comes into close firm contact with the aggregate forming a strong bond therewith, and it retains that bond even though the roadway becomes wetted.

After the mixing of the ingredients is thoroughly effected and all of the aggregate is provided with a coating of the cement any other ingredients usually employed in making this type of pavement may be added and mixed therewith, but care should be taken not to use those which adversely affect the properties of the mixture, such for instance, as adding to the mixture more filler but carrying an electric charge opposite to that which had been previously added to impart a desired polarity to the cement. If more filler were to be added to the mixture above described it should be electrically positive.

The gum rosin may be added to the cement before the cement is added to the aggregate and the modifier carrying a charge of electricity opposite to that of the aggregate may be added to the cement before it is applied to the aggregate, but it makes little difference when the gum rosin is added to the mixture for the rosin is readily soluble in the cement but the insoluble modifier in a finely divided condition is preferably distributed throughout the cement before it is added to the aggregate, in order to impart to the cement the desired polarity or the electric charge opposite to that of the aggregate.

While the invention is particularly useful in the making of bituminous roadways it is not, however, to be construed as limited thereto, for whenever it is desired to form a strong permanent water-resistant bond between a bituminous cement and an aggregate or other object, my invention is equally applicable. Thus in making a sheet pavement using silica sand as the aggregate, this aggregate being normally negative, a positive cement should be used therewith for the best results, such as blown asphalt, Mexican asphalt, Gulf Coast asphalt and their polarity may be increased by addition thereto of Portland cement, hydrated lime, carbonated lime or powdered limestone. If, however, a negative cement only is available, then sufficient of the said positive modifiers should be added to change the polarity or electric charge carried by the asphalt from negative to positive. The surface tension of the melted cement is also preferably reduced by the addition of a small quantity of gum rosin as in the proportions about above described with reference to the other type of paving material.

The same principle will apply in the making of bituminous mixtures of asphalt and mineral aggregates, when the asphalt is a dispersion of asphalt in water or an emulsion. The rosin should first be mixed and blended with the asphalt prior to emulsification or dispersion and the powdered modifier should be selected from a list of those modifiers carrying an electric charge opposite to that of the aggregate. If the aggregate were limestone then powdered coal or other carbon, or powdered silica or powdered feldspar should be added to the cement to increase the difference in the electric potential between the cement and the aggregate sufficiently to make the cement practically negative, in order to insure a firm bond between the cement and the positive aggregate limestone.

In painting compositions also, the character of the electric charge (positive or negative) of the object to be coated should be known or ascertained by appropriate test as for example, by electrophoresis, and that being known, a bitumen having an opposite polarity may be used or its polarity may be changed, as above described, to the opposite of that of the object and the surface tension of the bitumen may also be reduced by the addition to the bitumen of suitable modifiers as above described.

Having thus described my invention, what I claim and desire to protect by Letters Patent of the United States is:

1. The method of making a bituminous, water resistant paving mixture, which consists in adding to the bituminous cement, to be used therewith, a finely divided material substantially insoluble in said cement and carrying an electric charge opposite to that of the aggregate to be coated therewith and distributing said material throughout said cement, coating said aggregate with said cement by agitation, and adding to the mixture, under agitation, a small quantity of a substance, a quantity of which as small as one per cent of the weight of the cement does not substantially lessen the water resistance of the cement and greatly decreases the surface tension of the cement, and a greater quantity of which does not reduce the surface tension as much as the smaller quantity does and reduces the resistance of said cement to water.

2. The method of making a paving material, which consists in adding to the aggregate, with agitation, a fluid asphalt, a powdered substance, insoluble in the asphalt and carrying an electric charge opposite to that of the aggregate and which imparts its polarity to the cement, and a small quantity of a surface tension reducing substance, a quantity of which as small as one per cent of the weight of the asphalt greatly decreases the surface tension of the liquid asphalt and does not appreciably lessen the resistance of said asphalt to water.

3. The method of making a paving material, which consists in adding to a mineral aggregate a normally substantially solid asphalt in a fluent condition and containing a material having a polarity opposite to that of the aggregate, and agitating said ingredients together in the presence of a small quantity of a material which, in said small quantities, greatly lowers the surface tension of said asphalt and does not appreciably impair the resistance of said asphalt to the action of water.

4. The method of making a paving material which consists in adding to a mineral aggregate a substantially solid asphalt made fluent by heat and containing a material having a polarity opposite to that of the aggregate, and agitating said ingredients together in the presence of a small quantity of a material which substantially lowers the surface tension of said asphalt, said quantity being so small that it does not substantially decrease the water resistance of the asphalt.

5. The method of making a paving material, which consists in adding to a mineral aggregate a substantially solid asphalt in a fluent condition and agitating said ingredients together in the presence of a small quantity of a material which, in small quantities, greatly lowers the surface tension of said asphalt, said quantity being so small that it does not substantially decrease the water resistance of the asphalt.

6. The method of making a paving material, which consists in adding to a mineral aggregate, a substantially fluid asphalt containing as ingredients, a powdered material having a polarity opposite to that of the aggreate, and containing a small quantity of a resinous gum which greatly lowers the surface tension of the asphalt, the quantity of said resinous gum being from one-half of one per cent to one per cent of the weight of said asphalt.

7. The method of making a paving material, which consists in adding to a mineral aggregate a substantially solid asphalt in fluent condition and agitating said ingredients together in the presence of a small quantity of a gum rosin which substantially lowers the surface tension of the asphalt, the quantity being from one-half of one per cent to one per cent of the weight of the asphalt.

8. The method of making a bituminous paving material, which consists in reducing to a fluent condition a bitumen which is substantiallly solid at atmospheric temperatures, adding to said fluent bitumen a resinous ingredient, and distributing said ingredient throughout said bitumen uniformly, coating a mineral aggregate therewith and then allowing the bituminous coating to resolidify at atmospheric temperatures, said resinous ingredients so added veing very small in quantity and comprising only from substantially one-half of one per cent to substantially one per cent of the weight of the bitumen, said small quantity of resinous material being operative to greatly reduce the surface tension of said fluent bitumen, but inoperative to impair the resistance of the substantially solid bitumen coating to water.

9. The method of making a bituminous paving material, which consists in reducing to a fluent condition a bitumen which is substantially solid at atmospheric temperatures, adding to said fluent bitumen a powdered ingredient, and a resinous ingredient, and distributing said ingredients throughout said bitumen uniformly, coating a mineral aggregate therewith and then allowing the bituminous coating to resolidify at atmospheric temperatures, said powdered ingredient so added to the bituminous material having a polarity opposite to that of the aggregate, and said resinous ingredient so added being very small in quantity and comprising only from substantially one-half of one per cent to substantially one per cent of the weight of the bitumen, said small quantity of resinous material being operative to greatly reduce the surface of said fluent bitumen, but inoperative to impair the resistance of the substantially solid bitumen coating to water.

SAMUEL S. SADTLER.